United States Patent
Brendel (10) Patent No.: US 10,907,641 B2
(45) Date of Patent: Feb. 2, 2021

(54) MULTI-FAN ASSEMBLY CONTROL

(71) Applicant: LAU Holdings, LLC, Dayton, OH (US)

(72) Inventor: Michael Brendel, Centerville, OH (US)

(73) Assignee: LAU HOLDINGS, LLC, Dayton, OH (US)

( * ) Notice: Subject to any disclaimer, the term of this patent is extended or adjusted under 35 U.S.C. 154(b) by 168 days.

(21) Appl. No.: 15/969,035

(22) Filed: May 2, 2018

(65) Prior Publication Data

US 2019/0293077 A1 Sep. 26, 2019

Related U.S. Application Data (60) Provisional application No. 62/645,332, filed on Mar. 20, 2018.

(51) Int. Cl.
| | | |
|---|---|---|
| F04D 27/00 | (2006.01) | |
| F04D 25/08 | (2006.01) | |
| F24F 11/77 | (2018.01) | |
| F24F 13/24 | (2006.01) | |
| F04D 25/16 | (2006.01) | |
| F24F 130/40 | (2018.01) | |

(52) U.S. Cl.
CPC ........... *F04D 27/004* (2013.01); *F04D 25/08* (2013.01); *F04D 25/166* (2013.01); *F24F 11/77* (2018.01); *F24F 13/24* (2013.01); *F24F 2130/40* (2018.01)

(58) Field of Classification Search
CPC ...... F04D 25/08; F04D 25/166; F04D 27/004; F04D 29/668; F24F 11/77; F24F 13/24; F24F 2130/40
See application file for complete search history.

(56) References Cited

U.S. PATENT DOCUMENTS

| | | | |
|---|---|---|---|
| 7,282,873 B2 | 10/2007 | Abali et al. | |
| 7,565,226 B1 | 7/2009 | Cooley et al. | |
| 8,845,299 B1 * | 9/2014 | Hughes | F04D 25/166 |
| | | | 417/2 |
| 9,251,859 B2 | 2/2016 | Mundt et al. | |
| 9,473,060 B2 * | 10/2016 | Shahi | H02P 23/04 |
| 9,477,274 B2 | 10/2016 | Hartman et al. | |
| 2003/0015983 A1 * | 1/2003 | Montero | G06F 1/206 |
| | | | 318/473 |
| 2013/0079933 A1 | 3/2013 | Tan et al. | |
| 2013/0101389 A1 * | 4/2013 | Chou | F04D 25/166 |
| | | | 415/1 |
| 2013/0336805 A1 * | 12/2013 | Shibata | F04D 27/004 |
| | | | 417/44.1 |
| 2016/0013745 A1 | 1/2016 | North et al. | |

(Continued)

FOREIGN PATENT DOCUMENTS

| | | |
|---|---|---|
| WO | 2012081929 | 6/2012 |
| WO | WO 2012/081929 A2 * | 6/2012 |

*Primary Examiner* — Charles G Freay
(74) *Attorney, Agent, or Firm* — Calfee, Halter & Griswold LLP (57) ABSTRACT

A fan assembly includes a first fan, a second fan, and a controller. The controller is configured to determine that an air movement demand corresponds to operation of the first fan and the second fan at a resonance speed, instruct the first fan to operate at a first speed which is less than the resonance speed, and instruct the second fan to operate at a second speed which is greater than the resonance speed.

24 Claims, 7 Drawing Sheets

(56) References Cited

U.S. PATENT DOCUMENTS

2017/0097003 A1* 4/2017 Chen ............... F04D 19/002
2018/0108339 A1* 4/2018 Young ............... F04D 25/166
2018/0367575 A1* 12/2018 Narayanaswamy .. G06F 16/285

* cited by examiner

MULTI-FAN ASSEMBLY CONTROL

CROSS REFERENCE TO RELATED APPLICATIONS

This application claims priority from and the benefit of U.S. Provisional Application Ser. No. 62/645,332, entitled "MULTI-FAN ASSEMBLY CONTROL," filed Mar. 20, 2018, which is hereby incorporated by reference in its entirety for all purposes.

BACKGROUND

The present disclosure relates generally to heating, ventilation, and air conditioning (HVAC) systems and, more particularly, to control of a multi-fan assembly in an HVAC system.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator coil where the fluid absorbs heat and a condenser where the fluid releases heat. The fluid flowing within the closed loop is generally formulated to undergo phase changes within the normal operating temperatures and pressures of the system, so that quantities of heat can be exchanged by virtue of the latent heat of vaporization of the fluid. A fan assembly may blow air over, or pull air across, the coils of the heat exchanger(s) in order to condition the air.

Traditional fan assemblies may be susceptible to vibration during certain operating conditions. The vibration of the traditional fan assembly may reduce an efficiency of the fan assembly, and may cause noise pollution proximate to the fan assembly. Accordingly, improved fan assemblies, and control thereof, are desired.

SUMMARY

The present disclosure relates to a fan assembly having a first fan, a second fan, and a controller. The controller is configured to determine that an air movement demand corresponds to operation of the first fan and the second fan at a resonance speed, instruct the first fan to operate at a first speed which is less than the resonance speed, and instruct the second fan to operate at a second speed which is greater than the resonance speed.

The present disclosure also relates to a fan assembly controller having processing circuitry configured to receive or determine a demand for air movement by the fan assembly, determine that the demand for air movement corresponds to operation of a first fan of the fan assembly and a second fan of the fan assembly at a resonance speed, instruct the first fan to operate at a first speed which is less than the resonance speed, and instruct the second fan to operate at a second speed which is greater than the resonance speed.

The present disclosure also relates to a fan controller. The fan controller includes a memory having a non-transitory, computer-readable medium including one or more sequences of instructions that, when executed by one or more processors, cause the one or more processors to perform certain operations. The operations include determining an air movement demand corresponds to operation of a first fan of the fan assembly and a second fan of the fan assembly at a resonance speed, instructing the first fan to operate at a first speed which is less than the resonance speed, and instructing the second fan to operate at a second speed which is greater than the resonance speed.

DETAILED DESCRIPTION

The present disclosure is directed toward heating, ventilation, and air conditioning (HVAC) systems and, more particularly, to control of a multi-fan assembly in an HVAC system. For example, the multi-fan assembly may be utilized to move a fluid, such as air, through portions of the HVAC system. A controller may control operation of the two or more fans in order to cause a desired movement of air through the fan assembly, where the desired movement of air may be based at least in part on operating and/or environmental conditions, including user inputs.

The fans of the fan assembly may operate over a range of speeds in order to deliver the desired airflow. In certain embodiments, at least one resonance speed of the fans may be included within the working or operating range of speeds. That is, when operating the fans at the at least one resonance speed, the fans of the fan assembly may drive each other, and the fan assembly generally, into excess vibration. The excess vibration may lead to structural fatigue of the fan assembly and other components of the HVAC system. Since the fans of the fan assembly may be substantially similar in shape and operation, the fans may share natural frequencies and, when operated at these natural frequencies, may together drive excess vibration of the fan assembly. Of course, the fans may share natural frequencies with each other even in embodiments where the fans differ in shape and/or operation. Further, more than two fans may be included in the fan assembly, and the fan assembly may experience similar vibrations. Generally, the vibrations may reduce an efficiency of the fan assembly, and may cause noise pollution proximate to the fan assembly. Traditional embodiments may be designed with expensive structures to dampen the vibrations, and/or traditional embodiments may be designed with a reduced operating range of speeds such that no resonance speeds are within the reduced operating range of speeds. Thus, traditional solutions are expensive and/or reduce an effectiveness and versatility of the system.

In accordance with present embodiments, a control scheme of the fan assembly may cause the fans of the fan assembly to avoid excess vibrations caused by operating at the resonance speed(s). For example, a controller of the HVAC system, or of the fan assembly specifically, may determine whether the desired movement of air through the fan assembly corresponds to operation of the fans at one of the resonance speeds. In other words, the resonance speed(s) of the fan assembly may be known by the controller, such as by way of a factory baselining procedure. Additionally or alternatively, one or more vibration sensors may be included in the system, and may provide vibration data to the controller. Certain vibration data, such as vibration data indicative of operating vibrations exceeding a threshold amount, may alert the controller that the fans are operating at one of the resonance speeds. When the controller detects or determines that the fans are operating, or that the fans would otherwise be instructed to operate, at the resonance speed, the controller may instruct a first fan of the fan assembly to operate at a speed less than the resonance speed, and the controller may instruct a second fan of the fan assembly to operate at a speed greater than the resonance speed. In certain embodiments, the first fan speed and the second fan speed may diverge from the resonance speed a comparable amount. That is, the speed of the first fan and the speed of the second fan may straddle the resonance speeds. In doing so, the fan assembly produces the desired movement of air without causing excess vibrations in the fan assembly.

It should be noted that more than two fans may be included in the fan assembly, and a similar control scheme as described above can be deployed. Indeed, embodiments with an odd number of fans can be controlled to avoid the resonance speed and to deliver the desired movement of air. These and other features are described in detail below with reference to the drawings.

Figure 1:
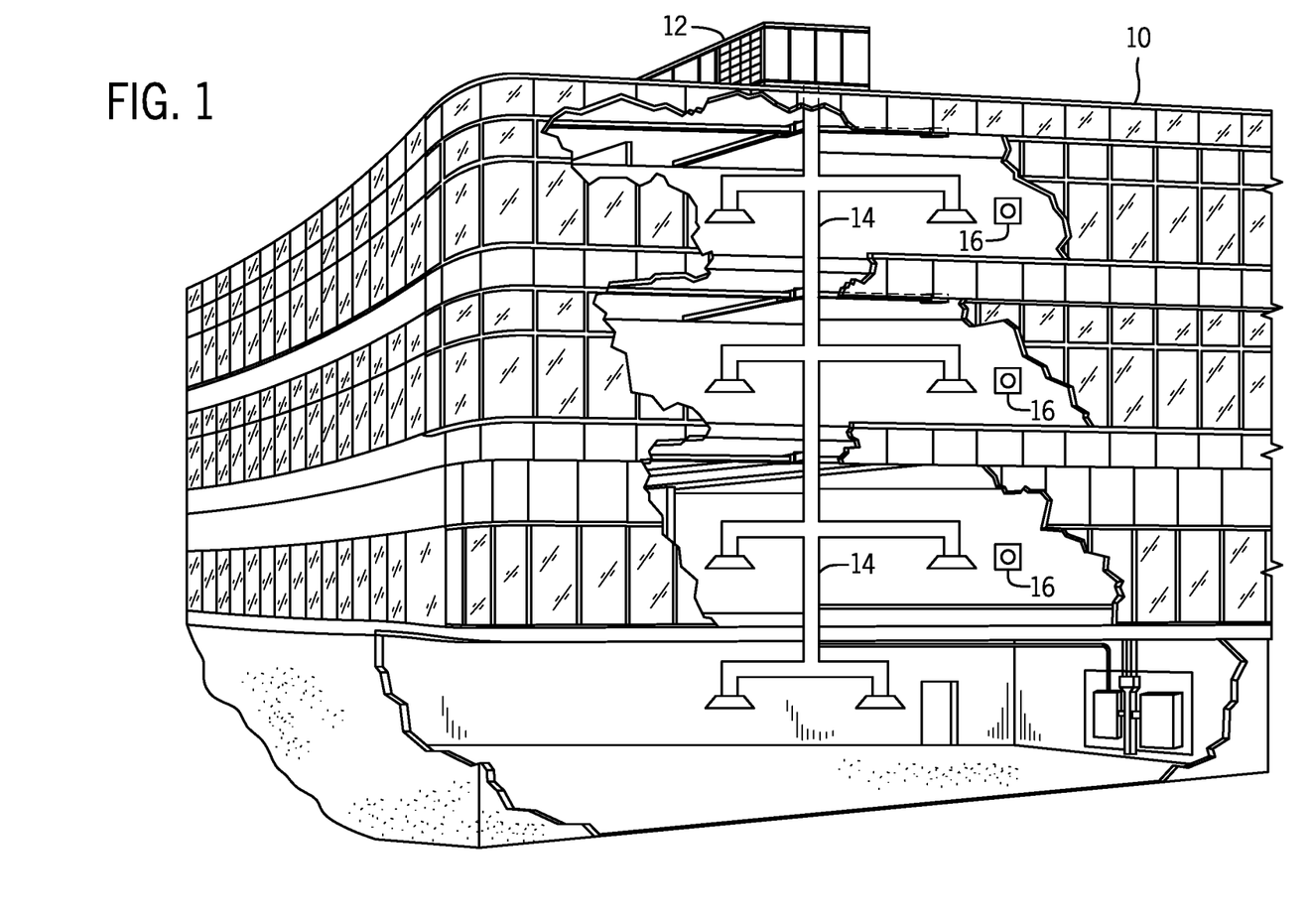
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
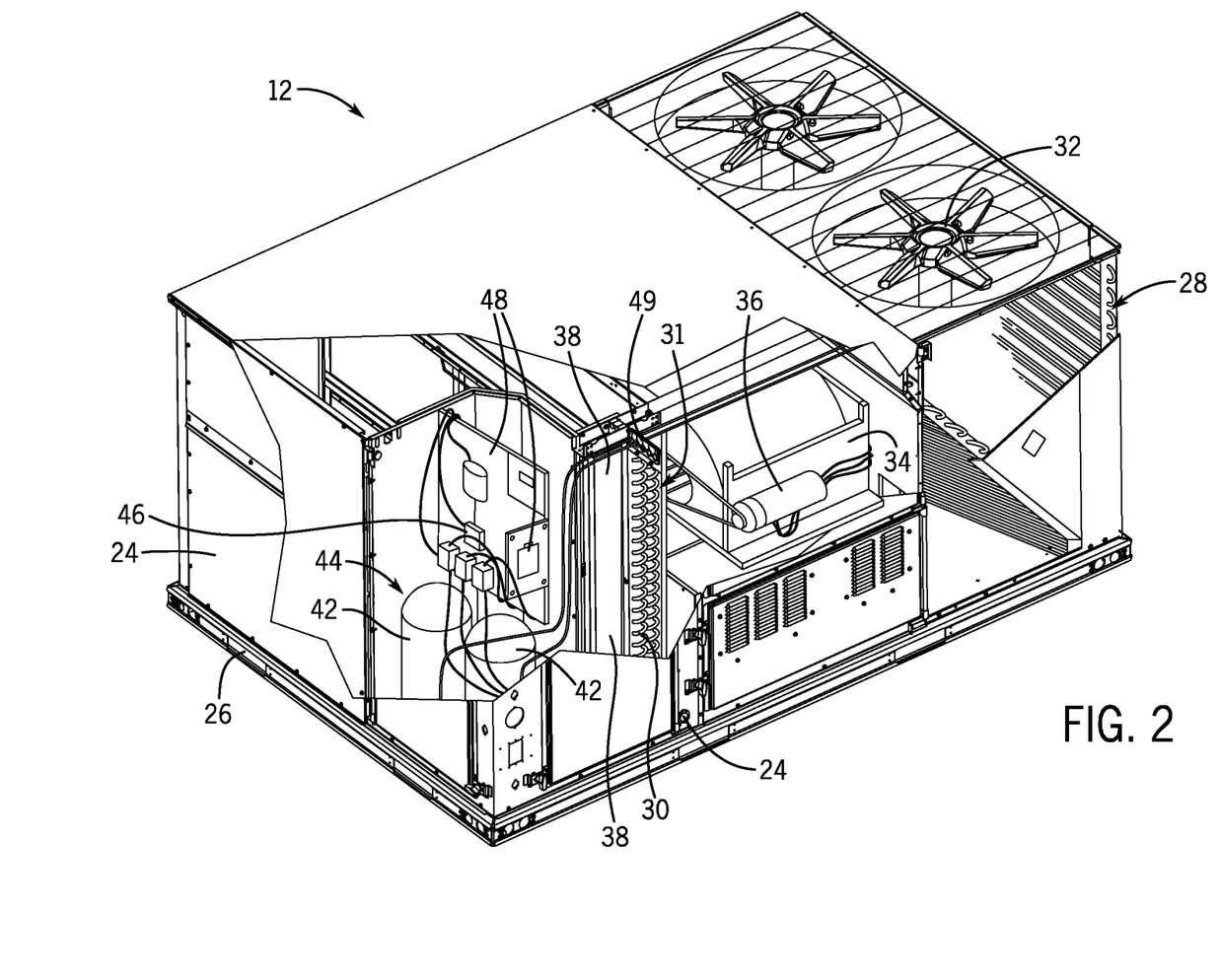
FIG. 2 is a perspective view of the packaged HVAC unit of the HVAC system of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel and/or microchannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
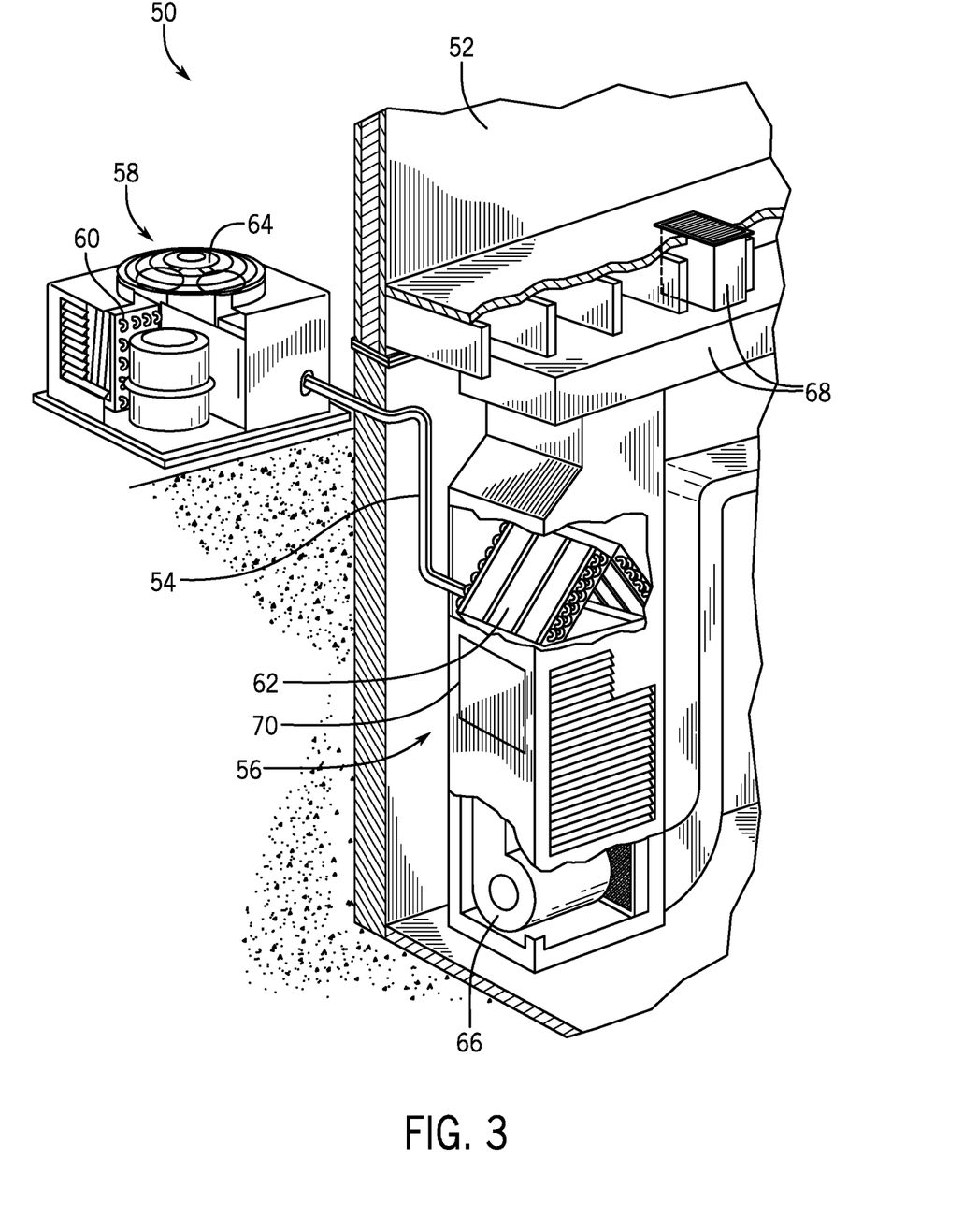
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
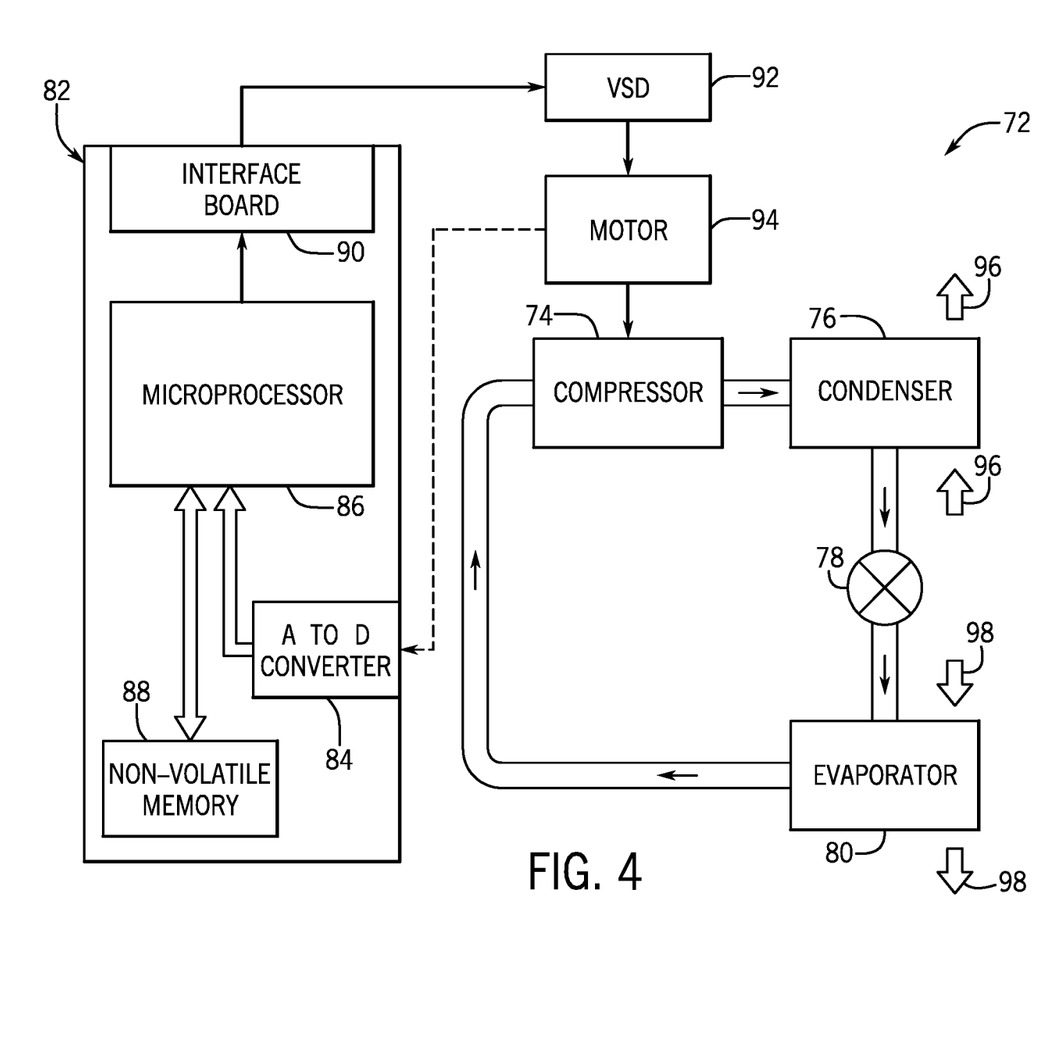
FIG. 4 is a schematic diagram of a vapor compression system that may be used in the packaged HVAC system of FIG. 2 and the residential HVAC system of FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. Further, any of FIGS. 1-4 may include, in accordance with an aspect of the present disclosure, a fan assembly having two or more fans controlled to avoid resonance speeds while maintaining a desired airflow through the fan assembly. In doing so, vibrations of the fan assembly are reduced or negated, which increases an efficiency of the fan assembly and decreases noise pollution proximate to the fan assembly. These and other features are described in detail below with reference to the drawings.

Figure 5:
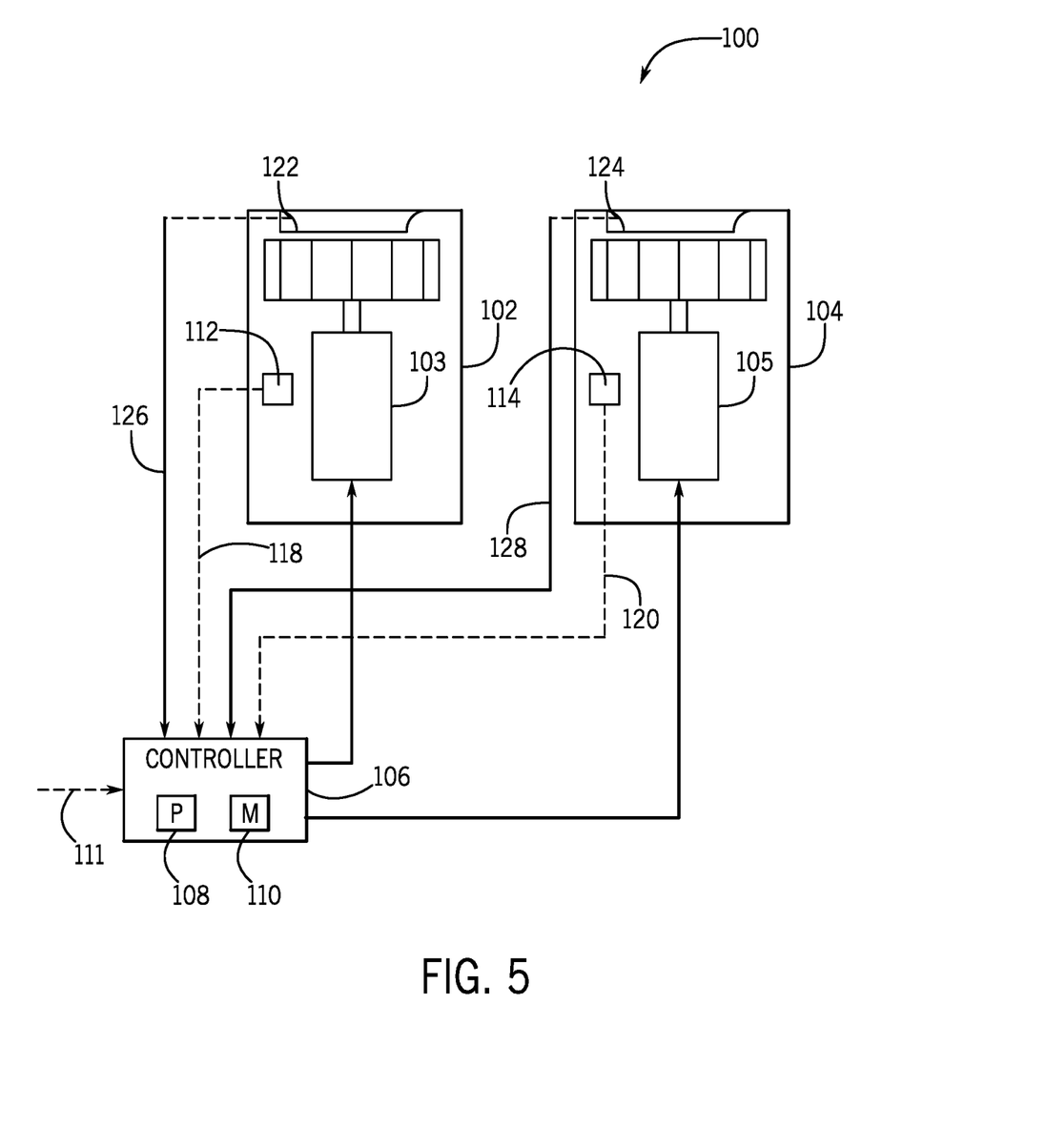
FIG. 5 is a schematic diagram of an embodiment of a fan assembly having two fans for use in any of the systems illustrating in FIGS. 1-4, in accordance with embodiments described herein.

FIG. 5 is a schematic diagram of an embodiment of a fan assembly 100 having two fans for use in any of the systems illustrated in FIGS. 1-4. In the illustrated embodiment, the fan assembly 100 includes a first fan 102 and a second fan 104, where the first fan 102 and the second fan 104 are controlled to operate in parallel. More particularly, a controller 106 may be configured to control a first motor 103 that drives the first fan 102, and a second motor that drives the second fan 104. As previously described, in some embodiments, VSDs may be disposed between each motor 103, 105 and the controller 106. The controller 106 may include a processor 108 and a memory 110, where the memory 110 is configured to store instructions thereon that, when executed by the processor 108, cause the controller 106 to perform certain acts. The acts performed by the controller 106 may include analyzing various inputs to the controller 106, and actuating components of the fan assembly 100, such as the motors 103, 105, based on those inputs. In some embodiments, the inputs may include data received by the controller 106 and indicative of operating parameters of the fan assembly 100. Further, in some embodiments, the inputs may include data stored to the memory 108, such as data indicative of certain qualities of the fans 102, 104 or fan assembly 100, as described below.

During normal operation, the controller 106 may instruct the first motor 103 to drive the first fan 102 and the second motor 105 to drive the second fan 104 at substantially equal speeds. In other words, during normal operation, a first rotational speed of the first fan 102 may be approximately equal to a second rotational speed of the second fan 104. The first fan 102 and the second fan 104 may also include a comparable operating range of speeds and/or other comparable operating parameters. In certain embodiments, at least one resonance speed may be included within the operating range of speeds, where the resonance speed(s) correspond to a vibration frequency which amplifies otherwise small vibratory forces in the fans 102, 104 or fan assembly 100. That is, when the fans 102, 104 are driven at the at least one resonance speed, the fans 102, 104 of the fan assembly 100 may drive each other, and the fan assembly 100 generally, into excess vibration. The excess vibration may lead to structural fatigue of the fan assembly 100 and other components of the HVAC system. In accordance with present embodiments, and as described in detail below, the controller 106 may be configured to actuate the fans 102, 104, or more particularly the fan motors 103, 105, to avoid the resonance speed(s) while maintaining a desired flow rate through the fan assembly 100.

The controller 106 of the fan assembly 100, which may be a fan-dedicated controller or a system controller, may determine a desired movement of air through the fan assembly 100. For example, the controller 106 may determine a desired flow rate of air through the fan assembly 100, or desired flow rates of air through each of the fans 102, 104. This determination may be based on a desired output of the system, certain operating and/or environmental factors, or other factors. In the illustrated embodiment, the controller 106 determines the desired movement of air through the fan assembly 100 based on a flow rate command/demand input 111, which may be based on a building automation control, a manual input, a system-level controller, another input device, or other factors.

The controller 106 may then determine whether the desired movement of air, or desired flow rate[s], corresponds to operation of the fans 102, 104 at a resonance speed. In other words, the resonance speed(s) of the fans 102, 104 of the fan assembly 100 may be known by the controller 106, such as by way of a factory baselining procedure. The data indicative of the resonance speed(s) may be stored to the memory 110 of the controller 106. Additionally or alternatively, the first fan 102 may include a first vibration sensor 112, and the second fan 104 may include a second vibration sensor 114. The first vibration sensor 112 may provide a vibration data input 118 indicative of vibrations in the first fan 102 to the controller 106, and the second vibration sensor 114 may provide a vibration data input 120 indicative of vibrations in the second fan 104 to the controller 106. In some embodiments, a single vibration sensor may be included for both fans 102, 104 of the fan assembly 100. In general, the vibration data input(s) 118, 120 may be analyzed by the controller 106 to determine whether the vibrations exceed a vibration threshold indicative of the fans 102, 104 operating at a resonance speed. However, as previously described, the resonance speeds may be quantities pre-stored, or manually entered, to the memory 110 of the controller 106.

After the controller 106 determines that the fans 102, 104 are operating at a resonance speed, or would otherwise by instructed to operating at the resonance speed via control of the intervening motors 103, 105, the controller 106 may adjust the speeds of the fans 102, 104 to avoid the resonance speed while maintaining a desired air flow. That is, the controller 106 may instruct the first motor 103 to drive the first fan 102 at a first operating speed which is less than the resonance speed, and the controller 106 may instruct the second motor 105 to drive the second fan 104 at a second operating speed which is greater than the resonance speed. In some embodiments, the first operating speed of the first fan 102 may differ from the resonance speed by an amount approximately equal to a difference between the second operating speed of the second fan 104 and the resonance speed. Thus, the resonance speed is avoided by both fans 102, 104, and, assuming the air movement is linearly related to fan speed, a desired air flow through the fan assembly 100 is maintained. In embodiments in which fan speed is not linearly related to the air movement, or more particularly the flow rate, an algorithm having the relationship between the fan speed and the air movement may be employed to determine how much the speed of the first fan 102 should diverge from the resonance speed, and how much the speed of the second fan 104 should diverge from the resonance speed, to maintain the desired air movement. It should be noted that, in addition to maintaining the desired air flow, efficiency of the system may be improved by way of the vibration reduction. Further, in addition to maintaining the desired air flow, noise pollution caused by vibration of the fan assembly 100 is reduced.

In some embodiments, the first fan 102 may also include a first air sensor 122, and the second fan 104 may also include a second air sensor 124. The first and second air sensors 122, 124 may be configured to detect an air flow parameter, such as a flow rate, associated with the first and second fans 102, 104, respectively. The first air flow sensor 122 provides flow rate data 126 associated with the first fan 102 to the controller 106, and the second air flow sensor 124 provides flow rate data 128 associated with the second fan 104 to the controller 106. The flow rate data 126, 128 may be utilized to check that the desired air flow is maintained during operating modes in which the controller 106 adjusts the fan speeds to avoid a resonance speed, as previously described. In other embodiments, the flow rate data 126, 128 may be used as an input to determine a correlation between the desired movement of air, the actual movement of air, and the fan speeds employed. In other words, the flow rate data 126, 128 may serve as a check regarding whether the control scheme to avoid the resonance speed maintains the desired air flow, and/or the flow rate data 126, 128 may serve as an input to the controller 106 for determining control of the fans 102, 104 to avoid the resonance speed.

Figure 6:
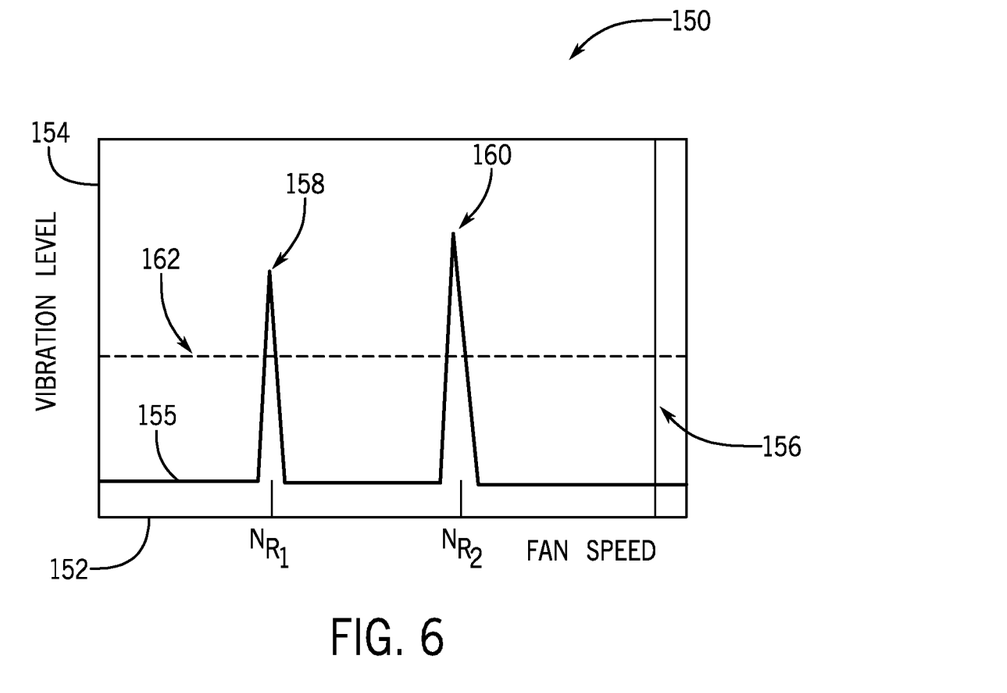
FIG. 6 is a plot illustrating resonance speeds of the embodiment of the fan assembly of FIG. 5, in accordance with embodiments described herein.

FIG. 6 is a plot 150 illustrating resonance speeds of the embodiment of the fan assembly of FIG. 5. The plot 150 illustrates vibration level 154 measured against fan speed 152. That is, a vibrational profile 155 of the fans over an operating range of speeds is shown. The fans are capable of operating up to a maximum speed 156 illustrated in the plot 150. However, in the illustrated embodiment, a first resonance speed 158 and a second resonance speed 160 are shown within the operating range of speeds. If the fans both operate at the first resonance speed 158, or if the fans both operate at the second resonance speed 160, the fans and fan assembly will be driven into excess vibration beyond a tolerable vibration threshold 162. The description below, with respect to FIG. 7, clarifies how the control scheme avoids any excess vibrations beyond the tolerable vibration threshold 162.

Figure 7:
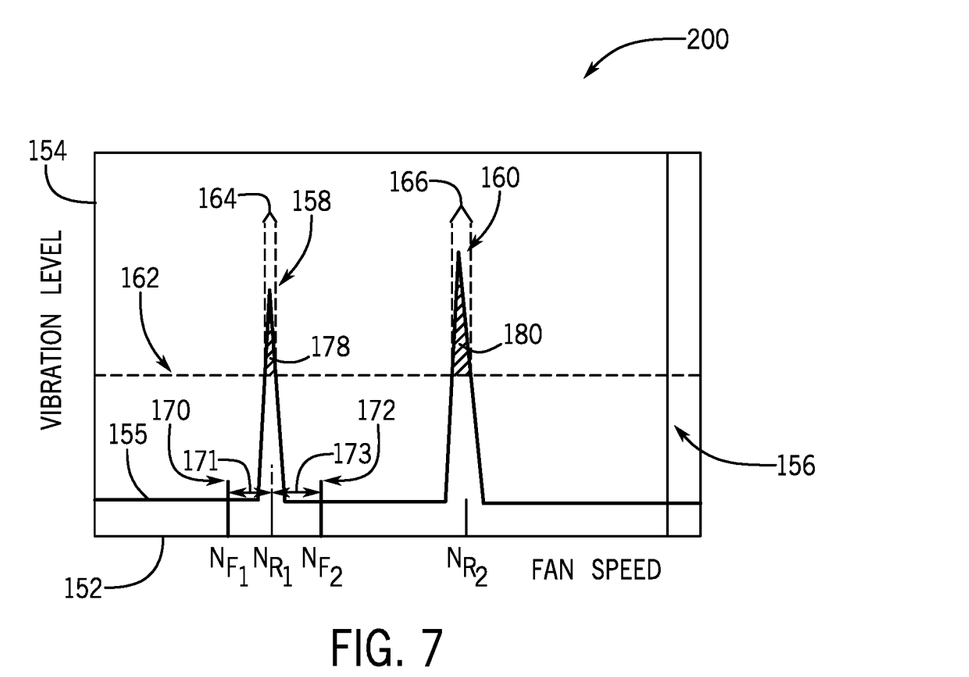
FIG. 7 is a plot illustrating resonance speeds of the embodiment of the fan assembly of FIG. 5, and illustrating a control scheme for avoiding vibrations induced by operation at the resonance speeds, in accordance with embodiments described herein.

FIG. 7 is a plot 200 illustrating resonance speeds of the embodiment of the fan assembly of FIG. 5, and illustrating a control scheme for avoiding vibrations induced by operation at the resonance speeds. For example, the plot 180 illustrates the same vibrational profile 155 of the fans over an operating range of speeds, the first resonance speed 158, the second resonance speed 160, and the vibration threshold 162. In the illustrated embodiment, the control scheme is shown with respect to the first resonance speed 158. For example, as previously described, the controller may adjust a first fan speed 170 of the first fan to be less than the first resonance speed 158 by a first amount 171, and a second fan speed 172 of the second fan to be greater than the first resonance speed 158 by a second amount 173. In the illustrated embodiment, the first amount 171 is approximately equal to the second amount 173, such that the average speed of the two fans is approximately the first resonance speed 158, but such that each fan individually avoids the first resonance speed 158. It should be noted that the same approach could be taken with respect to the second resonance speed 160, if needed, or any other resonance speed over the operating range of speeds.

The vibrational profile 155 includes two peaks corresponding with the first resonance speed 158 and the second resonance speed 160. However, as shown, each peak includes a corresponding range of speeds at which vibrations exceed a permissible amount. That is, a first resonance range of speeds 164 corresponds to the first peak, and a second resonance range of speeds 166 corresponds to the second peak. For purposes of the present disclosure, the first "resonance speed" encompasses any speed within the illustrated first envelope 178 at which the natural vibrational frequencies of the fans would cause the vibrational profile 155 of the fans to exceed the vibration threshold 162. Likewise, the second "resonance speed" encompasses any speed within the illustrated second envelope 180 at which the natural vibrational frequencies of the fans would cause the vibrational profile 155 of the fans to exceed the vibration threshold 162. The term "true resonance speed" is used to refer to the point at which the vibrations are a maximum.

It should be noted that the above-described control scheme can be employed for a fan assembly having any number of fans. For example, in embodiments where the fan assembly includes four fans, two of the fans may be operated at a first equal speed less than the resonance speed, and two of the fans may be operated at a second equal speed greater than the resonance speed. The first equal speed of the first two fans may be approximately equal to the second equal speed of the other two fans. Similar control strategy can be employed for an embodiment having 2, 4, 6, 8, 10, 12, or more fans.

Figure 8:
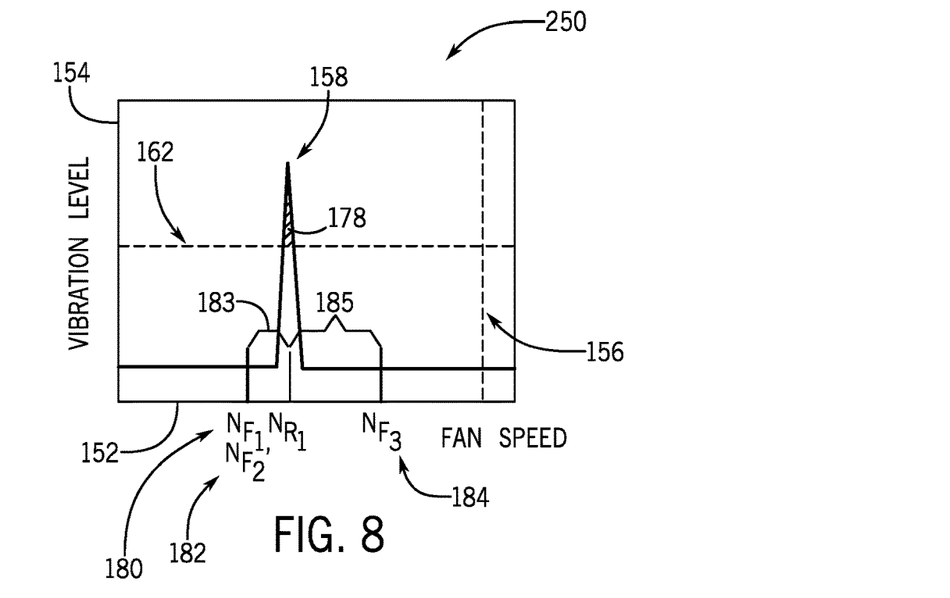
FIG. 8 is a plot illustrating resonance speeds of an embodiment of a fan assembly having three fans, and illustrating a control scheme for avoiding vibrations induced by operation of the fan assembly at the resonance speeds, in accordance with embodiments described herein.

The control strategy may also be employed similarly for an embodiment having an odd number of fans, such as three fans. In certain embodiments in accordance with the present disclosure, a system employing three fans may operate one of the three fans at the resonance speed, and the other two fans straddling the resonance speed as described above. Alternatively, the system may control all three fan speeds to avoid the resonance speed. For example, FIG. 8 is a plot 250 illustrating resonance speeds of an embodiment of a fan assembly having three fans, and illustrating a control scheme for avoiding vibrations induced by operation of the fan assembly at the resonance speeds. In the illustrated embodiment, the controller may determine that the desired movement of air would correspond with operating the three fans at the resonance speed 158. However, the controller may instruct the first fan to operate at a first fan speed 180, a second fan to operate at a second fan speed 182 approximately equal to the first fan speed 180, and a third fan to operate at a third fan speed 184 which is different than the first and second fan speeds 180, 182. The first and second fan speeds 180, 182 may be less than the resonance speed 158 by a first amount 183, and the third fan speed 184 may be greater than the resonance speed 158 by a second amount 185 that is two times greater than the first amount 183. Thus, the average speed of the three fans is the resonance speed 158, but none of the fans operate at the resonance speed 158. It should be noted, in another embodiment, more fans may be operated at the higher speed and less fans may be operated at the lower speed. The example above is non-limiting and intended to clarify the control scheme with respect to an embodiment having an odd number of fans.

It should be noted that the plots 150, 200, 250 in FIGS. 6, 7, and 8, respectively, are indicative of a control scheme that maintains the flow rate through the fans when the fan speed and flow rate are linearly related, or close to being linearly related. Depending on the step-size between the fan speeds and the resonance speed, the illustrated control scheme may be effective in maintaining the desired flow even if the fan speed and the flow rate are not linearly related. However, it is presently contemplated that an algorithm may be employed to determine the amount the first fan speed should diverge from the resonance speed, and the amount the second fan speed should diverge from the resonance speed, in order to maintain the desired flow. That is, in some embodiments, the fan speeds may diverge from the resonance speed by different amounts.

Figure 9:
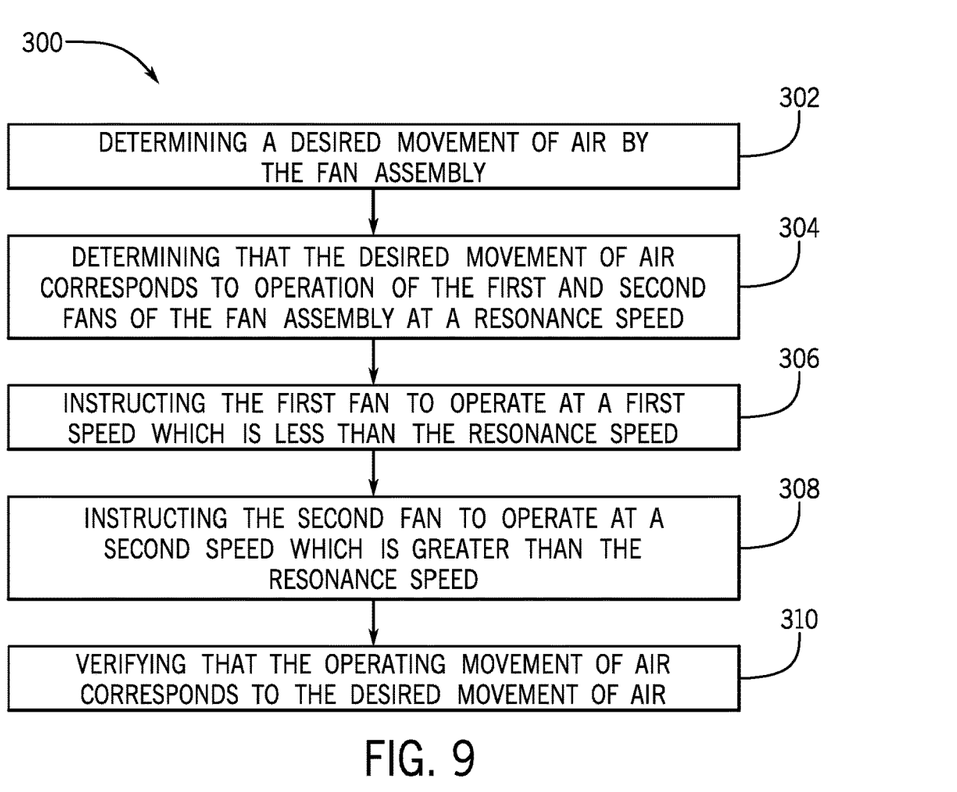
FIG. 9 is a block diagram illustrating an embodiment of a method of controlling a fan assembly having two or more fans, in accordance with embodiments described herein.

FIG. 9 is a block diagram illustrating an embodiment of a method 300 of controlling a fan assembly having two or more fans, in accordance with an aspect of the present disclosure. The illustrated method 300 includes determining (block 302) a desired movement of air by the fan assembly. For example, a fan assembly controller may receive a flow rate command from a system-level controller or another input, and the fan assembly controller may control the fans to facilitate the flow rate command.

The method 300 also includes determining (block 304) that the desired movement of air corresponds to operation of a first fan of the fan assembly and a second fan of the fan assembly at a resonance speed. For example, upon receiving the flow rate command noted above, the controller may determine an ideal fan speed which will enable the flow rate indicated in the command. As previously described, certain flow rates may correspond with resonance speeds of the fan assembly.

The method 300 also includes instructing (block 306) the first fan to operate at a first speed which is less than the resonance speed, and instructing (block 308) the second fan to operate at a second speed which is greater than the resonance speed. As previously described, the first fan speed may be less than the resonance speed and the second fan speed may be more than the resonance speed by an approximately equal amount; thus, the average speed is the resonance speed, but neither fan operates at the resonance speed. In doing so, the flow rate may be maintained, and excess vibrations associated with the resonance speed may be reduced or negated.

In some embodiments, the method 300 also includes verifying (block 310) that the operating movement of air, or operating flow rate, corresponds to the desired movement of air, or desired flow rate. In other words, while the above-described control scheme is intended to maintain the desired flow rate while avoiding resonance speeds, in some embodiments, the operate flow rate may diverge from the desired flow rate. Thus, air sensors of the fans may be communicatively coupled with the controller, where the air sensors provide operating flow rate data for the controller to analyze. The controller may adjust the fan speeds based on the operating flow rate diverging from the desired flow rate, and/or the controller may instruct a shut-down mode. For example, if the flow rate diverges from the desired flow rate by a threshold amount, the controller may instruct the shut-down mode.

Present embodiments are directed toward a fan assembly having a control scheme in which a desired flow rate of the fan assembly is maintained, but resonance speeds by the fans of the fan assembly are avoided. Technical advantages of the presently disclosed embodiments include improved operating efficiency of fan assemblies, improved noise reduction, and improved vibration control.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A fan assembly, comprising:
   a first fan;
   a second fan; and
   a controller configured to:
      determine that an air movement demand corresponds to operation of at least one of the first fan and the second fan at a resonance speed;
      instruct the first fan to operate at a first speed which is less than the resonance speed; and
      instruct the second fan to operate at a second speed which is greater than the resonance speed.

2. The fan assembly of claim 1, wherein the first fan and the second fan are configured to operate in parallel.

3. The fan assembly of claim 1, wherein the controller is configured to instruct the first fan to operate at the first speed which is less than the resonance speed by a first amount, wherein the controller is configured to instruct the second fan to operate at the second speed which is greater than the resonance speed by a second amount, and wherein the first amount is approximately equal to the second amount.

4. The fan assembly of claim 1, comprising a third fan.

5. The fan assembly of claim 4, wherein the controller is configured to instruct the third fan to operate at a third speed which is greater than the resonance speed.

6. The fan assembly of claim 5, wherein the controller is configured to instruct the first fan to operate at the first speed which is less than the resonance speed by a first amount, wherein the controller is configured to instruct the second fan to operate at the second speed which is greater than the resonance speed by a second amount, wherein the controller is configured to instruct the third fan to operate at the third speed which is greater than the resonance speed by a third amount, and wherein the first amount is approximately equal to a combination of the second amount and the third amount.

7. The fan assembly of claim 4, wherein the controller is configured to instruct the third fan to operate at a third speed which is less than the resonance speed.

8. The fan assembly of claim 7, wherein the controller is configured to instruct the first fan to operate at the first speed which is less than the resonance speed by a first amount, wherein the controller is configured to instruct the second fan to operate at the second speed which is greater than the resonance speed by a second amount, wherein the controller is configured to instruct the third fan to operate at the third speed which is less than the resonance speed by a third amount, and wherein a combination of the first amount and the third amount is approximately equal to the second amount.

9. The fan assembly of claim 1, comprising one or more vibration sensors communicatively coupled with the controller, wherein the one or more vibration sensors are configured to detect vibrations in the first fan, the second fan, or both, wherein the controller is configured to receive data indicative of the vibrations in the first fan, the second fan, or both from the one or more vibration sensors, and wherein the controller is configured to analyze the data indicative of the vibrations to determine that the air movement demand corresponds to operation of the first fan and the second fan at the resonance speed.

10. The fan assembly of claim 1, comprising one or more air sensors communicatively coupled with the controller, wherein the one or more air sensors are configured to detect an airflow parameter indicative of a flow rate of air through the first fan, the second fan, or both, and wherein the controller is configured to receive data indicative of the airflow parameter from the one or more air sensors.

11. The fan assembly of claim 10, wherein the controller is configured to:
   analyze the data indicative of the airflow parameter to determine the desired movement of air; or
   analyze the data indicative of the airflow parameter to determine that the flow rate corresponds to the desired movement of air.

12. A fan assembly controller comprising processing circuitry configured to:
   determine a demand for air movement by a fan assembly;
   determine that the demand for air movement corresponds to operation of at least one of a first fan of the fan assembly and a second fan of the fan assembly at a resonance speed;
   instruct the first fan to operate at a first speed which is less than the resonance speed; and
   instruct the second fan to operate at a second speed which is greater than the resonance speed.

13. The fan assembly controller of claim 12, wherein determining the demand for air movement by the fan assembly comprises receiving the demand for air movement by the fan assembly.

14. The fan assembly controller of claim 12, wherein the processing circuitry is configured to operate the first fan and the second fan in parallel.

15. The fan assembly controller of claim 12, wherein the processing circuitry is configured to:
   instruct the first fan to operate at the first speed which is less than the resonance speed by a first amount; and
   instruct the second fan to operate at the second speed which is greater than the resonance speed by a second amount, wherein the first amount is approximately equal to the second amount.

16. The fan assembly controller of claim 12, wherein the processing circuitry is configured to:
   receive data indicative of vibrations in the first fan, the second fan, or both; and
   analyze the data indicative of the vibrations to determine that the vibrations exceed a threshold vibration amount indicative of the first fan and the second fan operating at the resonance speed.

17. The fan assembly controller of claim 12, wherein the processing circuitry is configured to:
   receive data indicative of an operating flow rate of the fan assembly; and
   determine that the operating flow rate corresponds to the demand for air movement, wherein the demand for air movement comprises a target flow rate of the fan assembly.

18. The fan assembly controller of claim 12, wherein the processing circuitry is configured to:
   receive data indicative of an operating flow rate of the fan assembly; and
   analyze the data indicative of the operating flow rate to determine the demand for air movement.

19. A fan controller comprising a memory having a non-transitory, computer-readable medium including one or more sequences of instructions that, when executed by one or more processors, cause the one or more processors to perform operations comprising:

determining that an air movement demand corresponds to operation of at least one of a first fan of the fan assembly and a second fan of the fan assembly at a resonance speed;

instructing the first fan to operate at a first speed which is less than the resonance speed; and instructing the second fan to operate at a second speed which is greater than the resonance speed.

20. The fan controller of claim 19, wherein the operations comprise:

instructing the first fan to operate at the first speed which is less than the resonance speed by a first amount; and instructing the second fan to operate at the second speed which is greater than the resonance speed by a second amount, wherein the first amount is approximately equal to the second amount.

21. The fan controller of claim 19, wherein the determining operation comprises:

instructing the first fan, the second fan, or both to operate at the resonance speed based on the air movement demand;

receiving, from one or more vibration sensors, data indicative of vibrations of the first fan, the second fan, or both; and analyzing the data indicative of the vibrations to determine that the vibrations exceed a threshold vibration amount indicative of the first fan and the second fan operating at the resonance speed.

22. The fan controller of claim 19, wherein the operations comprise:

receiving, at the controller and from one or more air sensors, data indicative of a flow rate of air through the first fan, the second fan, or both; and analyzing the data indicative of the flow rate of air to determine the air movement demand.

23. The fan controller of claim 19, wherein the operations comprise:

receiving, at the controller and from one or more air sensors, data indicative of a flow rate of air through the first fan, the second fan, or both; and analyzing the data indicative of the flow rate of air to determine that an operating movement of air corresponds to the air movement demand.

24. The fan controller of claim 19, wherein the operations comprise operating the first fan and the second fan in parallel.

* * * * *